July 8, 1941. W. W. PRICHARD 2,248,194
PASTING APPARATUS
Filed Jan. 5, 1939
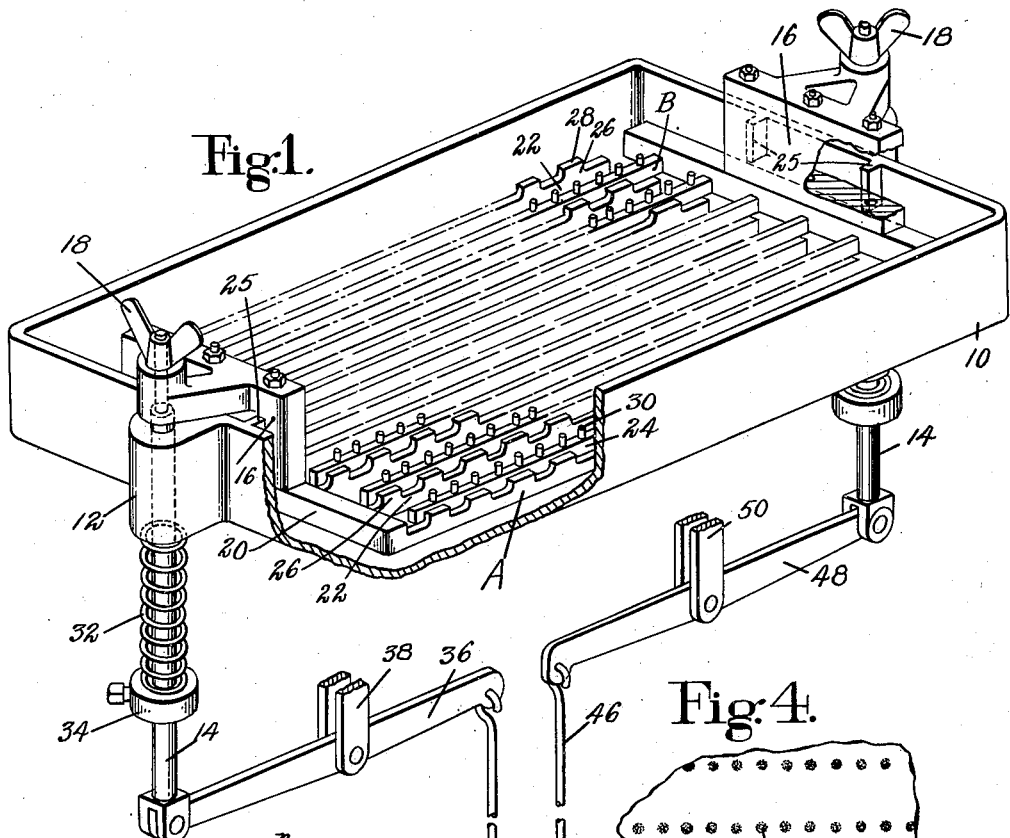
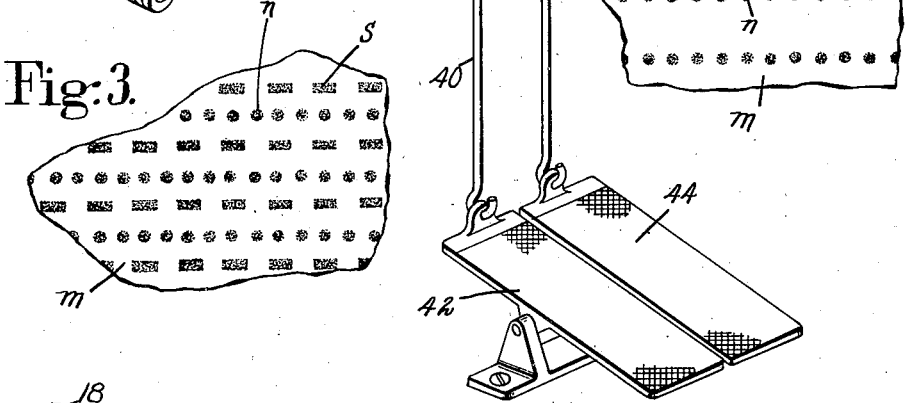
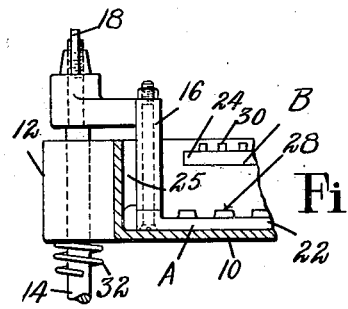
INVENTOR
William W. Prichard
By his attorney
Victor Colo Patented July 8, 1941

2,248,194

UNITED STATES PATENT OFFICE 2,248,194

PASTING APPARATUS

William W. Prichard, Marblehead, Mass., assignor to United Shoe Machinery Corporation, Borough of Flemington, N. J., a corporation of New Jersey Application January 5, 1939, Serial No. 249,417

7 Claims. (Cl. 91—47)

This invention relates to pasting apparatus and is herein illustrated as embodied in a paste pan of the type in which a grid is arranged to be alternately submerged in the paste in the pan and raised above the level of the paste to permit the application of a piece of work to the coated grid.

In the utilization of paste pans for the application of "paste," including various sorts of adhesive, to vamps, doublers, slip soles and the like, the user of the pan frequently desires to vary the quantity of adhesive applied. In the ordinary case where the apparatus is only provided with a single grid, this usually involves the substitution of a grid having applying members of different size or contour.

An object of the invention, accordingly, is to provide an improved pasting apparatus including a multisection grid, the portions of which are closely related and may be employed separately or together.

In the illustrated apparatus and in accordance with features of the invention, the grid sections comprise interdigitated bars carrying applying members. The applying members are here shown as furnished by the ends of projections carried by the bars and these projections on the respective sections have applying surfaces of different areas and different contours.

These and other features of the invention will be best understood from a consideration of the following description, taken in connection with the accompanying drawing, in which—

Fig. 1 is an angular view of an apparatus embodying my invention;

Fig. 2 is a vertical section through a portion of this apparatus, showing one section of the grid submerged and the other section raised;

Fig. 3 shows a fragment of a piece of work to which paste has been applied by both sections of the grid; and Fig. 4 shows a similar fragment to which paste has been applied by only one section of the grid.

The apparatus includes a paste pan 10 adapted to be mounted upon a bench (not shown) and to be partially filled with adhesive of any desired character. Formed at the ends of the pan are lugs 12 providing bearings for upright rods 14, which pass through the bench and to the upper ends of which brackets 16 are secured by means of wing nuts 18. Bolted to each of these brackets are grid sections A, B. These grid sections A and B embody end bars 20 from which project parallel bars 22 on the section A. Interspersed with these bars 22 are similar bars 24 on the section B. Interference between the interdigitated bars as a result of twisting movement of the brackets 16 is prevented by guide ribs 25 on the pan upon which the brackets ride. The bars 22 are provided with upstanding projections or lugs 26, the end surfaces 28 of which are elongated or bar-like to apply stripes $s$ of paste (Fig. 3). On the other hand, the bars 24 of section B are provided with a plurality of upstanding projections 30 in the form of flat-ended pins arranged to apply dots $n$ of paste (Fig. 4). Many other forms of applying members may be substituted, as desired, to vary the character of the coated area.

The grid section A is normally maintained submerged in the paste in the pan 10 by means of a spring 32 shown as coiled around the operating rod 14 and positioned between the under side of the lug 12 and a collar 34 attached to the rod. When it is desired to raise the grid section A, so that the projections will be above the level of the paste in the pan for the application of a piece of work thereto, the rod 14 is raised by a lever 36 fulcrumed in lugs 38 attached to the under side of the bench and connected by treadle rod 40 to an operating treadle 42. The quantity of paste applied to the work will then be determined by the area of the bar-like applying ends 28 and their spacing. If, on the other hand, it is desired to raise the grid section B, then this will be accomplished by depressing a treadle 44 positioned alongside the treadle 42 and connected by a similar treadle rod 46 and lever 48 fulcrumed on lugs 50 to the supporting rod 14 at the other end of the paste pan. The application of the paste to a piece of work $m$ will then be in the form of dots $n$ (Fig. 4), and quite clearly the quantity will be less than that applied by the grid section A. If the operator places his foot upon both treadles 42 and 44, then both sections A and B of the grid will be raised by a single movement of his foot and the application of paste to the work $m$ will combine dots $n$ and stripes $s$ (Fig. 3).

Inasmuch as the bars 22 and 24 of the respective grid sections are interspersed or interdigitated, the applying members of each of the grid sections will be distributed over substantially the total area of the paste pan. It is thus possible with a paste pan of moderate size to provide grid sections of different area and contour, by means of which the quantity of paste applied may be readily controlled. An operator using the apparatus needs only to depress one treadle or the other, or both treadles, in order to vary the quantity and configuration of the paste applied.

Having described my invention, what I claim as new and desire to secure by Letters Patent of the United States is:

1. In a pasting apparatus, a paste pan, a multi-section grid received within said pan and having a plurality of independent sections, each section having a plurality of spaced cement applying members, all the members of each section being within the ambit of all the members of the other section, and means for lifting one or another section of the grid for applying cement individually or in combination to the same area of work.

2. In a pasting apparatus, a paste pan, a grid received within the pan and having separately operable sections, each section of said grid having paste applying members, the members on one section being of different configuration than the members on the other section, and separate operating means for the sections of said grid whereby a lesser or a greater quantity of paste may be applied according to the grid operated.

3. In a pasting apparatus, a paste pan, interrelated separately operable grid sections therein each distributed through substantially the whole area of the pan and each lying substantially within the confines of the other whereby they may operate individually or in combination to present paste to the same area, and means for operating the grids separately.

4. In a pasting apparatus, a paste pan, interspersed grid sections arranged in said paste pan, applying members on each of said grid sections, and a plurality of operator controlled members for operating the grids separately, the applying members on one of said grid sections having at least twice the area of the applying members on the other of said grid sections.

5. In a pasting apparatus, a paste pan, grids each having interdigitated bars distributed over substantially the whole area of the pan, said bars having paste-applying portions, a plurality of operator-controlled members, and means operatively connecting said grids and said operator-controlled members.

6. In a pasting apparatus, a paste pan, interrelated grid sections consisting of parallel bars, upstanding projections on said bars, the projections on the bars of one section being circular in cross-section and the projections on the bars of the other section being rectangular in cross-section, and means for operating said apparatus to raise either one of said sections without raising the other whereby the quantity of paste applied may be varied.

7. In a pasting apparatus, a paste pan, a multi-section grid comprising oppositely disposed interdigitated bars, treadles placed side by side so that they may be operated separately or together by a single movement of the operator's foot, and connections from said treadles to the sections of said grid permitting them to be lifted separately or together.

WILLIAM W. PRICHARD.